United States Patent
Zhou

(10) Patent No.: US 11,552,773 B2
(45) Date of Patent: Jan. 10, 2023

(54) UPLINK CHANNEL RESOURCE INDICATION METHOD, UPLINK CHANNEL RESOURCE DETERMINATION METHOD, BASE STATION, TERMINAL AND MEDIUM

(71) Applicant: BEIJING UNISOC COMMUNICATIONS TECHNOLOGY CO., LTD., Beijing (CN)

(72) Inventor: Huan Zhou, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 32 days.

(21) Appl. No.: 17/265,860

(22) PCT Filed: Jun. 26, 2019

(86) PCT No.: PCT/CN2019/092980
§ 371 (c)(1),
(2) Date: Feb. 4, 2021

(87) PCT Pub. No.: WO2020/029698
PCT Pub. Date: Feb. 13, 2020

(65) Prior Publication Data
US 2021/0176028 A1   Jun. 10, 2021

(30) Foreign Application Priority Data
Aug. 8, 2018 (CN) .......................... 201810899832.X

(51) Int. Cl.
*H04L 5/00* (2006.01)
*H04W 72/12* (2009.01)
(Continued)

(52) U.S. Cl.
CPC .......... *H04L 5/0094* (2013.01); *H04L 1/1671* (2013.01); *H04W 72/044* (2013.01); *H04W 72/1268* (2013.01); *H04W 72/1289* (2013.01)

(58) Field of Classification Search
CPC .. H04L 5/0094; H04L 1/1671; H04W 72/044; H04W 72/1268; H04W 72/1289; H04W 72/04; H04W 72/02
(Continued)

(56) References Cited

U.S. PATENT DOCUMENTS 11,071,172 B2   7/2021   He et al.
2018/0337752 A1   11/2018   Choi et al.
(Continued)

FOREIGN PATENT DOCUMENTS

CN   102404584 A   4/2012
CN   102404854 A   4/2012
(Continued)

OTHER PUBLICATIONS

Samsung. "Considerations of Sub-Band Scheduling for 1.4 MHz MTC UE" 3GPP TSG RAN WG1 Meeting #80bis, R1-151589, Apr. 10, 2015 (Apr. 10, 2015), the main body, section 2.
(Continued)

*Primary Examiner* — Candal Elpenord
(74) *Attorney, Agent, or Firm* — Harness, Dickey & Pierce, P.L.C.

(57) ABSTRACT

An uplink channel resource indication method, an uplink channel resource determination method, a base station, a terminal and a medium are pr. The uplink channel resource indication method includes: indicating frequency domain resource information corresponding to N subbands contained in a current carrier to a UE through high-layer signaling, where N>1; and indicating one or more subbands for uplink data transmission to the UE through downlink
(Continued)

high-layer signaling is received from a base station, wherein the high-layer signaling includes frequency domain resource information corresponding to N subbands contained in a current carrier, where N>1 — S901 downlink control information is received from the base station, wherein the downlink control information includes one or more subbands for uplink data transmission, and a frequency domain resource corresponding to the one or more subbands for uplink data transmission is used to transmit uplink data, based on frequency domain resource information corresponding to the one or more subbands for uplink data transmission — S902 control information, so that the UE uses a frequency domain resource corresponding to the one or more subbands for uplink data transmission to transmit uplink data based on frequency domain resource information corresponding to the one or more subbands for uplink data transmission. Resource utilization and performance of a NR network may be improved.

18 Claims, 6 Drawing Sheets

(51) Int. Cl.
  *H04L 1/16* (2006.01)
  *H04W 72/04* (2009.01)
(58) Field of Classification Search
  USPC .................................................. 370/329–330
  See application file for complete search history.

(56) References Cited

U.S. PATENT DOCUMENTS

| | | |
|---|---|---|
| 2018/0343650 A1 | 11/2018 | Zhou |
| 2018/0367282 A1 | 12/2018 | Li et al. |
| 2019/0124649 A1* | 4/2019 | Lunttila ............ H04W 72/0446 |
| 2019/0253200 A1* | 8/2019 | Salem .................. H04W 16/14 |
| 2019/0268090 A1 | 8/2019 | Wang et al. |
| 2019/0289668 A1 | 9/2019 | He et al. |
| 2019/0357239 A1* | 11/2019 | Moon ................. H04W 72/042 |
| 2019/0364558 A1 | 11/2019 | Kim et al. |
| 2020/0021999 A1* | 1/2020 | Park ...................... H04W 76/11 |
| 2021/0176736 A1* | 6/2021 | Harada ................. H04W 72/04 |
| 2021/0176757 A1* | 6/2021 | Hwang ............... H04W 72/042 |

FOREIGN PATENT DOCUMENTS

| | | |
|---|---|---|
| CN | 105722229 A | 6/2016 |
| CN | 106507486 A | 3/2017 |
| CN | 106658742 A | 5/2017 |
| CN | 107210886 A | 9/2017 |
| CN | 107743315 A | 2/2018 |
| CN | 108076518 A | 5/2018 |
| EP | 3244553 A1 | 11/2017 |
| WO | WO-2018084660 A1 | 5/2018 |
| WO | WO-2018128938 A1 | 7/2018 |

OTHER PUBLICATIONS

International Search Report (English and Chinese) and Written Opinion (Chinese) of the International Searching Authority issued in PCT/CN2019/092980, dated Sep. 17, 2019; ISA/CN.
Extended European Search Report regarding Application No. 19848365.3 dated Apr. 8, 2022.
Ericsson: "Text proposal for subband sizes", Text Proposal for Subband Sizes, 3rd Generation Partnership Project, France; vol. RAN WG1, No. Vancouver, Canada; Jan. 29, 2018; pp. 1-2.

* cited by examiner

UPLINK CHANNEL RESOURCE INDICATION METHOD, UPLINK CHANNEL RESOURCE DETERMINATION METHOD, BASE STATION, TERMINAL AND MEDIUM

CROSS-REFERENCE TO RELATED APPLICATIONS

This application is a national phase of International Application No. PCT/CN2019/092980, filed on Jun. 26, 2019, which claims the benefit of priority to Chinese Patent Application No. 201810899832.X, filed on Aug. 8, 2018, and entitled "UPLINK CHANNEL RESOURCE INDICATION METHOD, UPLINK CHANNEL RESOURCE DETERMINATION METHOD BASE STATION, TERMINAL AND MEDIUM". The entire disclosure of the above applications are expressly incorporated by reference herein.

TECHNICAL FIELD

The present disclosure generally relates to communication field, and more particularly, to an uplink channel resource indication method, an uplink channel resource determination method, a base station, a terminal and a medium.

BACKGROUND

It is supported by the 3rd Generation Partnership Project (3GPP) standards organization to deploy a New Radio (NR) network on an unlicensed spectrum, so as to achieve fair and effective usage of the unlicensed spectrum and increase a data transmission rate of NR systems. There are three main ways for the NR network to use the unlicensed spectrum. The first one includes a User Equipment (UE) accessing a NR cell of an unlicensed spectrum as a primary cell, the second one includes a UE accessing a NR cell of an unlicensed spectrum through a Long Term Evolution (LTE) cell, and the third one includes a UE accessing a NR cell of an unlicensed spectrum through a NR cell. In the second and third ways, a licensed spectrum and an unlicensed spectrum are used cooperatively through carrier aggregation, that is, a terminal and an Evolved Node B (eNB) may simultaneously operate on the licensed spectrum and the unlicensed spectrum, which is called New RAT unlicense (NR-U) technology.

In LTE Licensed Assisted Access (LAA) technology, interlaces are adopted for Physical Uplink Share Channel (PUSCH) transmission, and each interlace is a basic unit of resource allocation, interlace of 20 MHz/10 MHz contains 10 Physical Resource Blocks (PRBs) evenly distributed in a frequency domain. For example, interlace 0 consists of Resource Blocks (RBs) with indexes of 0, 10, 20, . . . , 90. RB0 to RB9 constitute interlaced resource cluster 0, RB10 to RB19 constitute interlaced resource cluster 1, and so on. Each interlaced resource cluster contains 10 RBs which belong to different interlaces.

For the NR system, the Listen-Before-Talk (LBT) mechanism may be adopted to realize the coexistence of LAA and other systems of different operators in an unlicensed spectrum. During an LBT process, for an unlicensed spectrum, Clear Channel Assessment (CCA) is required to determine whether a current channel is available before data transmission.

In the existing NR system, a carrier or a Bandwidth Part (BWP) supports a relatively large bandwidth range, for example, greater than 20 MHz, or less than 20 MHz. Existing uplink resource indication uses full carrier or full BWP as a unit, thereby resulting in low resource utilization and poor NR network performance.

SUMMARY

Embodiments of the present disclosure may improve resource utilization and performance of a NR network.

In an embodiment of the present disclosure, an uplink channel resource indication method is provided, including: indicating frequency domain resource information corresponding to N subbands contained in a current carrier to a UE through high-layer signaling, where N>1; and indicating one or more subbands for uplink data transmission to the UE through downlink control information, so that the UE uses a frequency domain resource corresponding to the one or more subbands for uplink data transmission to transmit uplink data based on frequency domain resource information corresponding to the one or more subbands for uplink data transmission.

Optionally, the frequency domain resource information corresponding to the N subbands includes (N−1) Common Resource Block (CRB) indexes, wherein the (N−1) CRB indexes are used for indicating a starting CRB of the N subbands.

Optionally, indicating one or more subbands for uplink data transmission to the UE through downlink control information includes: indicating an index of the one or more subbands for uplink data transmission to the UE through a bitmap in the downlink control information.

Optionally, indicating one or more subbands for uplink data transmission to the UE through downlink control information includes: indicating an index of the one or more subbands for uplink data transmission to the UE through a resource indication value in the downlink control information.

Optionally, indicating an index of the one or more subbands for uplink data transmission to the UE through a resource indication value in the downlink control information includes: indicating the index of the one or more subbands for uplink data transmission using X bits in the resource indication value, wherein $$X = \mathrm{ceil}\left(\log_2 \frac{M \times (M+1)}{2}\right),$$

M is a total number of subbands contained in a current Bandwidth Part (BWP), and ceil( ) is a round-up operator.

Optionally, indicating one or more subbands for uplink data transmission to the UE through downlink control information includes: indicating a starting position and length of at least one interlaced resource cluster for uplink data transmission to the UE through a resource indication value in the downlink control information.

Optionally, indicating a starting position and length of at least one interlaced resource cluster for uplink data transmission to the UE through a resource indication value in the downlink control information includes: indicating the starting position and the length of the at least one interlaced resource cluster for uplink data transmission to the UE through Y bits in the resource indication value, wherein $$Y = \mathrm{ceil}\left(\log_2 \frac{K \times (K+1)}{2}\right),$$

K is a total number of interlaced resource clusters contained in a current BWP, and ceil( ) is a round-up operator.

In an embodiment of the present disclosure, an uplink channel resource determination method is provided, including: receiving high-layer signaling from a base station, wherein the high-layer signaling includes frequency domain resource information corresponding to N subbands contained in a current carrier, where N>1; and receiving downlink control information from the base station, wherein the downlink control information includes one or more subbands for uplink data transmission, and using a frequency domain resource corresponding to the one or more subbands for uplink data transmission to transmit uplink data, based on frequency domain resource information corresponding to the one or more subbands for uplink data transmission.

Optionally, the frequency domain resource information corresponding to the N subbands includes (N−1) CRB indexes, wherein the (N−1) CRB indexes are used for indicating a starting CRB of the N subbands.

Optionally, when downlink scheduling indicates that an access mode of a PUSCH is short LBT, all of the one or more subbands for uplink data transmission correspond to one PUSCH; and when downlink scheduling indicates that the access mode of the PUSCH is long LBT, each of the one or more subbands for uplink data transmission corresponds to one PUSCH.

Optionally, when the access mode of the PUSCH is long LBT, using the frequency domain resource corresponding to the one or more subbands for uplink data transmission to transmit uplink data includes: performing LBT detection on the one or more subbands indicated by the downlink control information; selecting a subband where the LBT detection succeeds as a candidate subband based on a result of the LBT detection; and using the frequency domain resource corresponding to the candidate subband to transmit uplink data.

Optionally, selecting a subband where the LBT detection succeeds as a candidate subband includes: among subbands where the LBT detection succeeds, selecting a subband with a smallest index value or a greatest index value as the candidate subband.

Optionally, using the frequency domain resource corresponding to the candidate subband to transmit uplink data further includes: determining a HARQ ID used by the PUSCH corresponding to the i-th time slot based on the following formula: mod($n_{HARQ\_ID}+i,N_{HARQ}$), where i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

Optionally, when the access mode of the PUSCH is long LBT, using the frequency domain resource corresponding to the one or more subbands for uplink data transmission to transmit uplink data includes: performing LBT detection on the one or more subbands indicated by the downlink control information; and using the frequency domain resource corresponding to the one or more subbands where the LBT detection succeeds to transmit uplink data based on a result of the LBT detection.

Optionally, for each time slot, the one or more subbands correspond to the same PUSCH or different PUSCHs.

Optionally, when the one or more subbands correspond to the same PUSCH, using the frequency domain resource corresponding to the one or more subbands where the LBT detection succeeds to transmit uplink data further includes: determining a HARQ ID used by the PUSCH corresponding to the i-th time slot based on the following formula: mod($n_{HARQ\_ID}+i,N_{HARQ}$), where i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

Optionally, when the one or more subbands correspond to different PUSCHs, the different PUSCHs correspond to different HARQ-ID versions and/or different Redundancy Version (RV) versions.

Optionally, when the one or more subbands correspond to different PUSCHs, using the frequency domain resource corresponding to the one or more subbands where the LBT detection succeeds to transmit uplink data further includes: determining a HARQ ID used by the PUSCH corresponding to the j-th subband based on the following formula: mod($n_{HARQ\_ID}+i \times M+j,N_{HARQ}$), where M is a total number of subbands contained in a current BWP, j is a subband index, j of 0 indicates the subband with a lowest frequency domain position, i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

In an embodiment of the present disclosure, a base station is provided, including: a first indication circuitry, configured to indicate frequency domain resource information corresponding to N subbands contained in a current carrier to a User Equipment (UE) through high-layer signaling, where N>1; and a second indication circuitry, configured to indicate one or more subbands for uplink data transmission to the UE through downlink control information, so that the UE uses a frequency domain resource corresponding to the one or more subbands for uplink data transmission to transmit uplink data based on frequency domain resource information corresponding to the one or more subbands for uplink data transmission.

Optionally, the frequency domain resource information corresponding to the N subbands includes (N−1) CRB indexes, wherein the (N−1) CRB indexes are used for indicating a starting CRB of the N subbands.

Optionally, the second indication circuitry is configured to indicate an index of the one or more subbands for uplink data transmission to the UE through a bitmap in the downlink control information.

Optionally, the second indication circuitry is configured to indicate an index of the one or more subbands for uplink data transmission to the UE through a resource indication value in the downlink control information.

Optionally, the second indication circuitry is configured to indicate the index of the one or more subbands for uplink data transmission using X bits in the resource indication value, wherein $$X = \text{ceil}\left(\log_2 \frac{M \times (M+1)}{2}\right),$$

M is a total number of subbands contained in a current Bandwidth Part (BWP), and ceil( ) is a round-up operator.

Optionally, the second indication circuitry is configured to indicate a starting position and length of at least one interlaced resource cluster for uplink data transmission to the UE through a resource indication value in the downlink control information.

Optionally, the second indication circuitry is configured to indicate the starting position and the length of the at least one interlaced resource cluster for uplink data transmission to the UE through Y bits in the resource indication value, wherein $$Y = \mathrm{ceil}\left(\log_2 \frac{K \times (K+1)}{2}\right),$$

K is a total number of interlaced resource clusters contained in a current BWP, and ceil( ) is a round-up operator.

In an embodiment of the present disclosure, a terminal is provided, including: a reception circuitry configured to receive high-layer signaling from a base station, wherein the high-layer signaling includes frequency domain resource information corresponding to N subbands contained in a current carrier, where N>1; and a process circuitry configured to receive downlink control information from the base station, wherein the downlink control information includes one or more subbands for uplink data transmission, and use a frequency domain resource corresponding to the one or more subbands for uplink data transmission to transmit uplink data, based on frequency domain resource information corresponding to the one or more subbands for uplink data transmission.

Optionally, the frequency domain resource information corresponding to the N subbands includes (N−1) CRB indexes, wherein the (N−1) CRB indexes are used for indicating a starting CRB of the N subbands.

Optionally, when downlink scheduling indicates that an access mode of a PUSCH is short LBT, all of the one or more subbands for uplink data transmission correspond to one PUSCH; and when downlink scheduling indicates that the access mode of the PUSCH is long LBT, each of the one or more subbands for uplink data transmission corresponds to one PUSCH.

Optionally, when the access mode of the PUSCH is long LBT, the process circuitry includes: a detection sub-circuitry configured to perform LBT detection on the one or more subbands indicated by the downlink control information; a selection sub-circuitry configured to select a subband where the LBT detection succeeds as a candidate subband based on a result of the LBT detection; and a first transmission sub-circuitry configured to use the frequency domain resource corresponding to the candidate subband to transmit uplink data.

Optionally, the selection sub-circuitry is configured to select, among subbands where the LBT detection succeeds, a subband with a smallest index value or a greatest index value as the candidate subband.

Optionally, the first transmission sub-circuitry is further configured to determine a HARQ ID used by the PUSCH corresponding to the i-th time slot based on the following formula: $\mathrm{mod}(n_{HARQ\_ID}+i, N_{HARQ})$, where i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

Optionally, when the access mode of the PUSCH is long LBT, the process circuitry includes: a detection sub-circuitry configured to perform LBT detection on the one or more subbands indicated by the downlink control information; and a second transmission sub-circuitry configured to use the frequency domain resource corresponding to the one or more subbands where the LBT detection succeeds to transmit uplink data based on a result of the LBT detection.

Optionally, for each time slot, the one or more subbands correspond to the same PUSCH or different PUSCHs.

Optionally, when the one or more subbands correspond to the same PUSCH, the second transmission sub-circuitry is further configured to determine a HARQ ID used by the PUSCH corresponding to the i-th time slot based on the following formula: $\mathrm{mod}(n_{HARQ\_ID}+i, N_{HARQ})$, where i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

Optionally, when the one or more subbands correspond to different PUSCHs, the different PUSCHs correspond to different HARQ-ID versions and/or different RV versions.

Optionally, when the one or more subbands correspond to different PUSCHs, the second transmission sub-circuitry is further configured to determine a HARQ ID used by the PUSCH corresponding to the j-th subband based on the following formula: $\mathrm{mod}(n_{HARQ\_ID}+i \times M+j, N_{HARQ})$, where M is a total number of subbands contained in a current BWP, j is a subband index, j of 0 indicates the subband with a lowest frequency domain position, i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

In an embodiment of the present disclosure, a nonvalatile or nontransitory computer readable storage medium having computer instructions stored therein is provided, wherein when the computer instructions are executed, the above uplink channel resource indication method, or the above uplink channel resource determination method is performed.

In an embodiment of the present disclosure, a base station including a memory and a processor is provided, wherein the memory has computer instructions stored therein, and when the processor executes the computer instructions, the above uplink channel resource indication method is performed.

In an embodiment of the present disclosure, a terminal including a memory and a processor is provided, wherein the memory has computer instructions stored therein, and when the processor executes the computer instructions, the above uplink channel resource determination method is performed.

Embodiments of the present disclosure may provide following advantages.

In embodiments of the present disclosure, frequency domain resource information corresponding to N subbands contained in a current carrier is indicated to a UE through high-layer signaling, and one or more subbands for uplink data transmission are further indicated to the UE through downlink control information, so that the UE transmits uplink data based on frequency domain resource information corresponding to the one or more subbands for uplink data transmission. An uplink resource can be indicated in unit of subband, thereby improving resource utilization and performance of a NR network.

Further, the high-layer signaling is received from the base station, and then the downlink control information is received from the base station, so that the UE uses a frequency domain resource corresponding to the one or more subbands for uplink data transmission to transmit uplink data, based on frequency domain resource information corresponding to the one or more subbands for uplink data transmission. An uplink resource can be indicated in unit of subband, thereby improving resource utilization and performance of a NR network.

DETAILED DESCRIPTION

In the existing NR system, a carrier or a BWP supports a relatively large bandwidth range, for example, greater than 20 MHz, or less than 20 MHz. Existing uplink resource indication uses full carrier or full BWP as a unit, thereby resulting in low resource utilization and poor NR network performance.

In embodiments of the present disclosure, frequency domain resource information corresponding to N subbands contained in a current carrier is indicated to a UE through high-layer signaling, and one or more subbands for uplink data transmission are further indicated to the UE through downlink control information, so that the UE transmits uplink data based on frequency domain resource information corresponding to the one or more subbands for uplink data transmission. An uplink resource can be indicated in unit of subband, thereby improving resource utilization and performance of a NR network.

In order to clarify the objects, characteristics and advantages of the disclosure, embodiments of present disclosure will be described in detail in conjunction with accompanying drawings.

Figure 1:
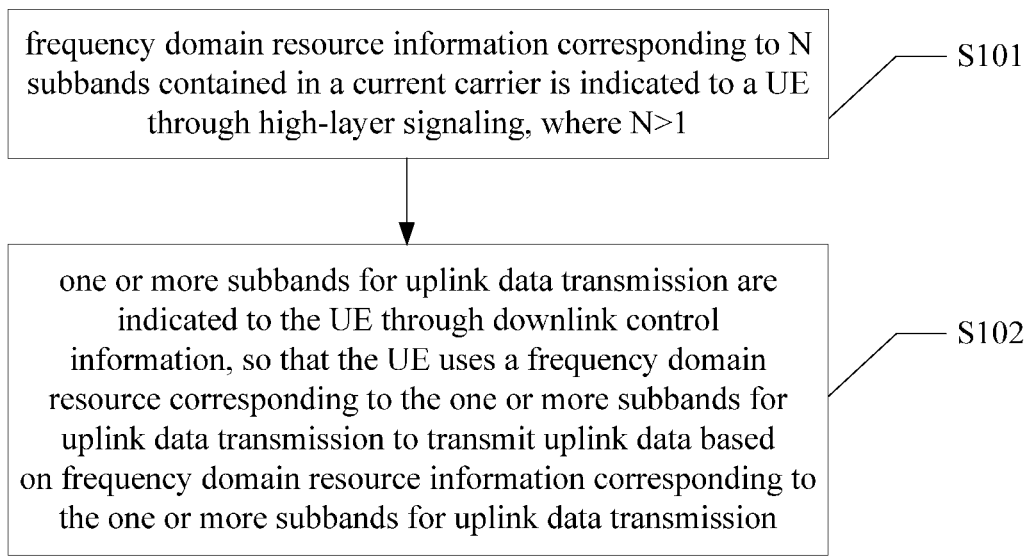
FIG. 1 is a flow chart of an uplink channel resource indication method according to an embodiment.

FIG. 1 is a flow chart of an uplink channel resource indication method according to an embodiment. Referring to FIG. 1, the method may include S101 and S102.

In S101, frequency domain resource information corresponding to N subbands contained in a current carrier is indicated to a UE through high-layer signaling, where N>1.

In the existing NR system, uplink resource indication uses full carrier or full BWP as a unit, thereby resulting in low resource utilization and poor NR network performance. In embodiments of the present disclosure, uplink resources may be indicated in unit of subband.

In some embodiments, to indicate uplink resources in unit of subband, it is necessary to indicate configuration information of the subbands, i.e., frequency domain resource information corresponding to the subbands, to the UE through high-layer signaling.

In some embodiments, bandwidth corresponding to the subband is less than or equal to bandwidth of the current carrier or bandwidth of the current BWP (i.e., the currently activated BWP).

In practice, the bandwidth of the subband may be 20 MHz, 40 MHz, or others, which is not limited in the present disclosure.

In some embodiments, the high-layer signaling may be cell-level high-layer signaling, that is, each cell indicates to the UE the frequency domain resource information corresponding to the N subbands contained in the current carrier.

In some embodiments, the frequency domain resource information corresponding to the N subbands includes (N−1) CRB indexes, wherein the (N−1) CRB indexes are used to indicate a starting CRB of the N subbands. That is, from a first available CRB index of the carrier bandwidth to the first CRB index minus 1 is the first subband, from the first CRB index to the second CRB index is the second subband, from the (N−1)-th CRB index to the greatest CRB index of the carrier bandwidth is the N-th subband.

For example, N=2, that is, the current carrier contains 2 subbands, and 1 CRB index is used to indicate the starting CRB of the 2 subbands. The CRB index of x means that from the first available CRB index of the carrier bandwidth (for example, CRB6) to (x−1) is the first subband, and from x to the greatest CRB index of the carrier bandwidth is the second subband.

In S102, one or more subbands for uplink data transmission are indicated to the UE through downlink control information, so that the UE uses a frequency domain resource corresponding to the one or more subbands for uplink data transmission to transmit uplink data based on frequency domain resource information corresponding to the one or more subbands for uplink data transmission.

In some embodiments, the one or more subbands for uplink transmission may be scheduled through Downlink Control Information (DCI).

In some embodiments, an index of the one or more subbands for uplink data transmission may be indicated to the UE through a bitmap in the downlink control information.

For example, downlink scheduling indicates that an access mode of a PUSCH is short LBT, the current carrier includes N subbands, and the current BWP includes M subbands, thus, the DCI includes a bitmap with M bits to indicate which subbands can be used for uplink data transmission. The frequency domain resource indication information in each subband is the same.

In some embodiments, an index of the one or more subbands for uplink data transmission may be indicated to the UE through a Resource Indication Value (RIV) in the downlink control information.

In some embodiments, the index of the one or more subbands for uplink data transmission may be indicated using X bits in the resource indication value, wherein $$X = \text{ceil}\left(\log_2 \frac{M \times (M+1)}{2}\right),$$

M is a total number of subbands contained in a current BWP, and ceil( ) is a round-up operator.

For example, downlink scheduling indicates that an access mode of a PUSCH is short LBT, the current carrier includes N subbands, and the current BWP includes M subbands, thus, the DCI includes a RIV field of M bits to indicate which subbands can be used for uplink data transmission.

Compared with using bitmap to indicate to the UE the index of the one or more subbands for uplink data transmission, using RIV to indicate to the UE the index of the one or more subbands for uplink data transmission can merely indicate continuous subbands, and the frequency domain resource indication information in each of the subbands is the same. Which method is used is determined according to requirements in practical applications.

In some embodiments, a frequency domain resource allocation field in the DCI may further be used to indicate which interlaces and which clusters are allocated, so that the UE can determine the one or more subbands for uplink data transmission based on a starting position and length of the cluster.

Figure 2:
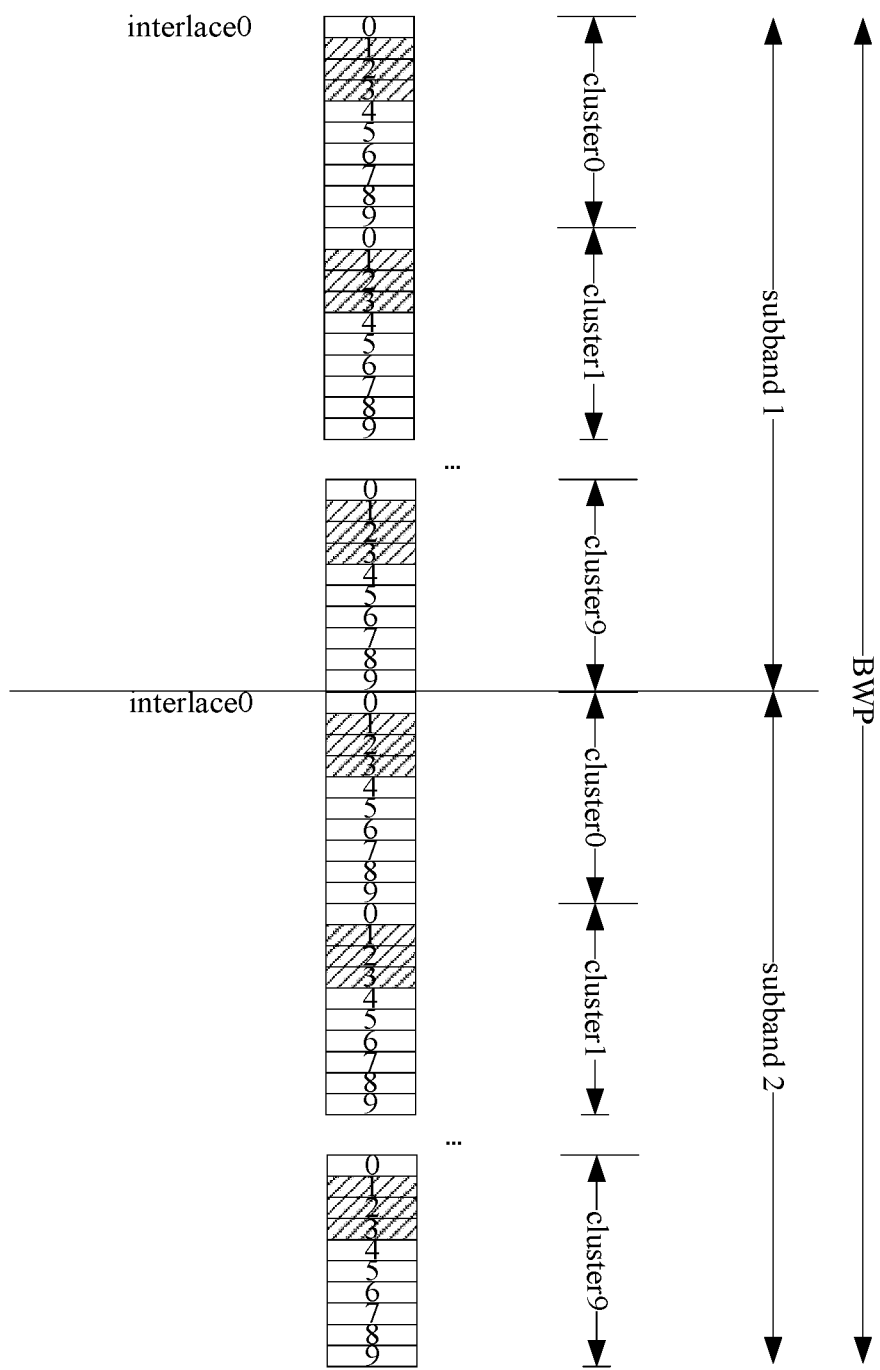
FIG. 2 is a diagram of a relation between interlace, cluster and subband according to an embodiment.

To enable those skilled in the art to better understand and implement the present disclosure, an embodiment of the present disclosure provides a diagram of a relation between interlace, cluster and subband according to an embodiment, as shown in FIG. 2.

Referring to FIG. 2, the bandwidth corresponding to the current BWP is 40 MHz, which is divided into subband 1 and subband 2, and the bandwidth corresponding to each subband is 20 MHz. Each subband corresponds to 10 clusters, which are cluster 0 to cluster 9. Each cluster contains 10 RBs including RB 0 to RB 9, and the 10 RBs belong to different interlaces. For example, interlace 0 consists of RBs with index 0 in each cluster.

In some embodiments, a starting position and length of at least one interlaced resource cluster for uplink data transmission may be indicated to the UE through a resource indication value in the downlink control information, so that the UE can determine the one or more subbands for uplink data transmission based on the starting position and the length of the interlaced resource cluster.

In some embodiments, indicating a starting position and length of at least one interlaced resource cluster for uplink data transmission to the UE through a resource indication value in the downlink control information includes: indicating the starting position and the length of the at least one interlaced resource cluster for uplink data transmission to the UE through Y bits in the resource indication value, wherein $$Y = \text{ceil}\left(\log_2 \frac{K \times (K+1)}{2}\right),$$

K is a total number of interlaced resource clusters contained in a current BWP, and ceil( ) is a round-up operator.

It should be noted that for special scenarios, if the one or more subbands for uplink data transmission the base station needs to indicate to the UE are all subbands in the current BWP, the downlink control information may not carry subband information, which also falls into the scope of the present disclosure.

By above embodiments of the present disclosure, frequency domain resource information corresponding to N subbands contained in a current carrier is indicated to a UE through high-layer signaling, and one or more subbands for uplink data transmission is further indicated to the UE through downlink control information, so that the UE transmits uplink data based on frequency domain resource information corresponding to the one or more subbands for uplink data transmission. An uplink resource can be indicated in unit of subband, thereby improving resource utilization and performance of a NR network.

Figure 9:
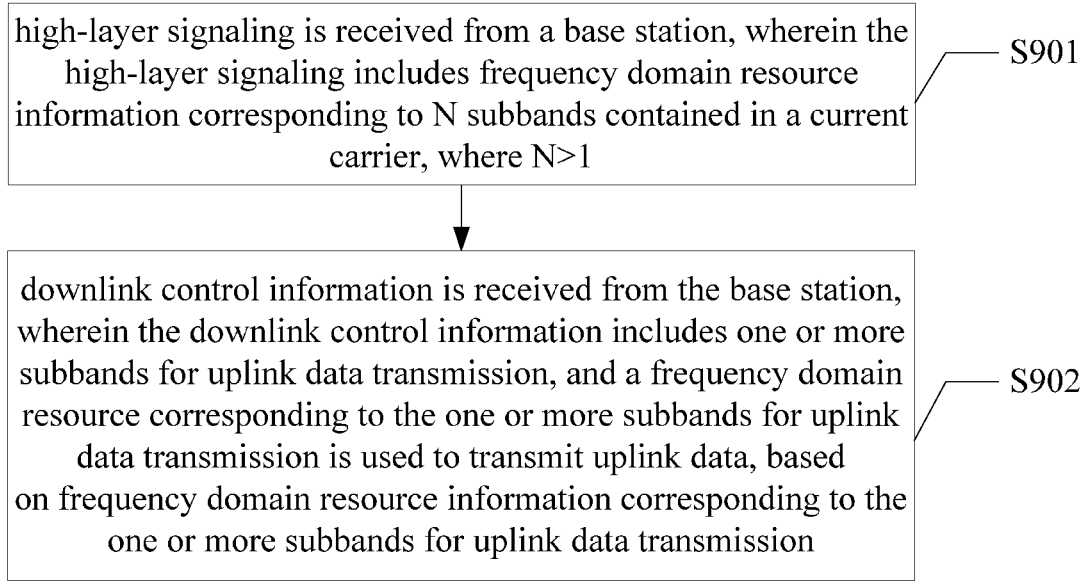
FIG. 9 is a flow chart of an uplink channel resource determination method according to an embodiment.

To enable those skilled in the art to better understand and implement the present disclosure, an embodiment of the present disclosure provides an uplink channel resource determination method as shown in FIG. 9.

Referring to FIG. 9, the uplink channel resource determination method includes S901 and S902.

In S901, high-layer signaling is received from a base station, wherein the high-layer signaling includes frequency domain resource information corresponding to N subbands contained in a current carrier, where N>1.

In some embodiments, the base station may use the method in the embodiment as shown in FIG. 1 to indicate the frequency domain resource information corresponding to the N subbands contained in the current carrier, which is not described in detail here.

In S902, downlink control information is received from the base station, wherein the downlink control information includes one or more subbands for uplink data transmission, and a frequency domain resource corresponding to the one or more subbands for uplink data transmission is used to transmit uplink data, based on frequency domain resource information corresponding to the one or more subbands for uplink data transmission.

In some embodiments, the base station may use the method in the embodiment as shown in FIG. 1 to indicate the one or more subbands for uplink data transmission, which is not described in detail here.

In some embodiments, the frequency domain resource information corresponding to the N subbands includes (N−1) CRB indexes, wherein the (N−1) CRB indexes are used for indicating a starting CRB of the N subbands.

In some embodiments, downlink scheduling may indicate an access mode of a PUSCH. When the access mode of the PUSCH is short LBT, all of the one or more subbands for uplink data transmission correspond to one PUSCH; and when the access mode of the PUSCH is long LBT, each of the one or more subbands for uplink data transmission corresponds to one PUSCH.

In some embodiments, if downlink scheduling indicates that an access mode of a PUSCH is short LBT, all of the one or more subbands for uplink data transmission correspond to one PUSCH; and if downlink scheduling indicates that the access mode of the PUSCH is long LBT, each of the one or more subbands for uplink data transmission corresponds to one PUSCH.

In some embodiments, when the access mode of the PUSCH is long LBT, using the frequency domain resource corresponding to the one or more subbands for uplink data transmission to transmit uplink data includes: performing LBT detection on the one or more subbands indicated by the downlink control information; selecting a subband where the LBT detection succeeds as a candidate subband based on a result of the LBT detection; and using the frequency domain resource corresponding to the candidate subband to transmit uplink data.

In some embodiments, based on the result of the LBT detection, any one subband may be selected from the subbands where the LBT detection succeeds as the candidate subband.

In some embodiments, selecting a subband where the LBT detection succeeds as a candidate subband includes: among subbands where the LBT detection succeeds, selecting a subband with a smallest index value or a greatest index value as the candidate subband.

In some embodiments, if merely one subband where the LBT detection succeeds is selected for uplink data transmission, a HARQ ID used by the PUSCH corresponding to the i-th time slot needs to be determined.

In some embodiments, using the frequency domain resource corresponding to the candidate subband to transmit uplink data further includes: determining a HARQ ID used by the PUSCH corresponding to the i-th time slot based on formula (1):

$$\mod(n_{HARQ\_ID}+i, N_{HARQ}) \quad (1),$$

where i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

Figure 3:
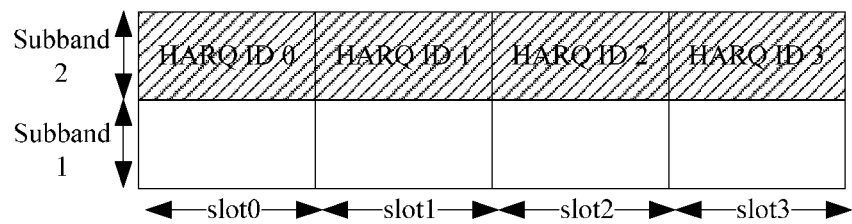
FIG. 3 is a diagram of a HARQ ID according to an embodiment.

To enable those skilled in the art to better understand and implement the present disclosure, an embodiment of the present disclosure provides a diagram of HARQ ID as shown in FIG. 3.

Referring to FIG. 3, the current BWP includes two subbands, DCI schedules 4 time slots, the starting HARQ ID is 0, and LBT detection succeeds in merely one subband (subband 2). In this case, the UE selects subband 2 to transmit PUSCH, and determines, based on the formula (1), that the HARQ IDs used by slot 0 to slot 3 are 0, 1, 2 and 3 respectively.

Figure 4:
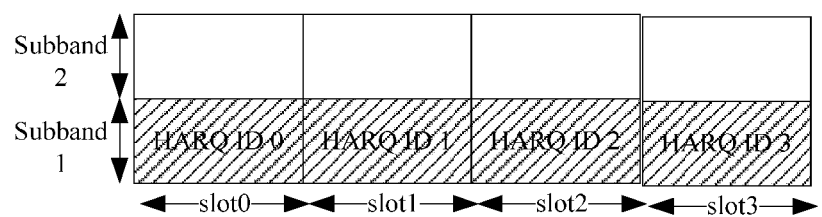
FIG. 4 is a diagram of a HARQ ID according to an embodiment.

To enable those skilled in the art to better understand and implement the present disclosure, an embodiment of the present disclosure provides another diagram of HARQ ID as shown in FIG. 4.

Referring to FIG. 4, the current BWP includes two subbands (subband 1 and subband 2), DCI schedules 4 time slots, the starting HARQ ID is 0, and LBT detection succeeds in both the two subbands. In this case, the UE selects subband 1 with a lower index value to transmit PUSCH, and determines, based on the formula (1), that the HARQ IDs used by slot 0 to slot 3 are 0, 1, 2 and 3 respectively.

In some embodiments, based on the result of the LBT detection, all the subbands where the LBT detection succeeds may be selected for uplink data transmission.

In some embodiments, when the access mode of the PUSCH is long LBT, using the frequency domain resource corresponding to the one or more subbands for uplink data transmission to transmit uplink data includes: performing LBT detection on the one or more subbands indicated by the downlink control information; and using the frequency domain resource corresponding to all the subbands where the LBT detection succeeds to transmit uplink data based on a result of the LBT detection.

In some embodiments, if frequency domain resources corresponding to all the subbands where the LBT detection succeeds are used for uplink data transmission, for each time slot, the subbands may correspond to the same PUSCH or different PUSCHs.

In some embodiments, if downlink scheduling indicates that an access mode of a PUSCH is long LBT, and the frequency domain resource allocation field in the DCI indicates that frequency domain resources in one or more subbands can be scheduled, the UE may select all subbands where the LBT detection succeeds from the subbands indicated through DCI by the base station to transmit the PUSCH, and the PUSCH transmitted in each subband is the same.

In some embodiments, when the one or more subbands correspond to the same PUSCH, using the frequency domain resource corresponding to all the subbands where the LBT detection succeeds to transmit uplink data further includes: determining a HARQ ID used by the PUSCH corresponding to the i-th time slot based on the formula (1).

Figure 5:
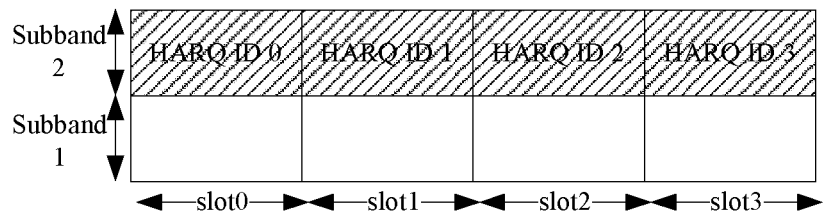
FIG. 5 is a diagram of a HARQ ID according to an embodiment.

To enable those skilled in the art to better understand and implement the present disclosure, an embodiment of the present disclosure provides another diagram of HARQ ID as shown in FIG. 5.

Referring to FIG. 5, the current BWP includes two subbands, DCI schedules 4 time slots, the starting HARQ ID is 0, and LBT detection succeeds in merely one subband (subband 2). In this case, the UE selects subband 2 to transmit PUSCH, and determines, based on the formula (1), that the HARQ IDs used by slot 0 to slot 3 are 0, 1, 2 and 3 respectively.

Figure 6:
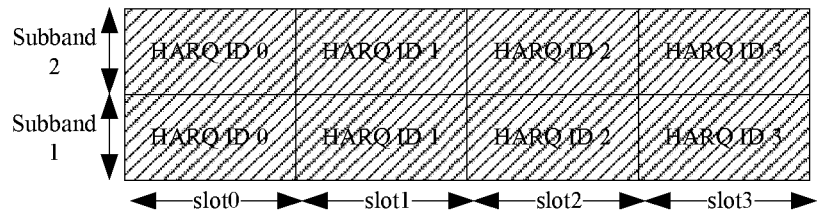
FIG. 6 is a diagram of a HARQ ID according to an embodiment.

To enable those skilled in the art to better understand and implement the present disclosure, an embodiment of the present disclosure provides another diagram of HARQ ID as shown in FIG. 6.

Referring to FIG. 6, the current BWP includes two subbands (subband 1 and subband 2), DCI schedules 4 time slots, the starting HARQ ID is 0, and LBT detection succeeds in both the two subbands. In this case, the UE selects both the subband 1 and the subband 2 to transmit the same PUSCH, and determines, for the subband 1 and the subband 2 based on the formula (1), that the HARQ IDs used by slot 0 to slot 3 are 0, 1, 2 and 3 respectively.

In some embodiments, when the one or more subbands correspond to different PUSCHs, the different PUSCHs correspond to different HARQ-ID versions and/or different RV versions.

In some embodiments, if downlink scheduling indicates that an access mode of a PUSCH is long LBT, and the frequency domain resource allocation field in the DCI indicates that frequency domain resources in one or more subbands can be scheduled, the UE may select all subbands where the LBT detection succeeds from the subbands indicated through DCI to transmit the PUSCH, and each subband corresponds to one independent PUSCH.

In some embodiments, when the UE successfully accesses multiple subbands, merely one PUSCH is allowed to be transmitted on each successful subband, Modulation and Coding Schemes (MCS) of the PUSCH transmitted on the multiple subbands are the same, and frequency domain interlaces are also the same. The difference lies in that the PUSCH transmitted in each subband uses a different HARQ-ID and/or a different RV version.

In some embodiments, when the multiple subbands correspond to different PUSCHs, using the frequency domain resource corresponding to all the subbands where the LBT detection succeeds to transmit uplink data further includes: determining a HARQ ID used by the PUSCH corresponding to the j-th subband based on formula (2):

$$\mod(n_{HARQ\_ID}+i\times M+j, N_{HARQ}) \quad (2),$$

where M is a total number of subbands contained in a current BWP, j is a subband index, j of 0 indicates the subband with a lowest frequency domain position, i is a relative index corresponding to a time slot for scheduling the PUSCH in the downlink control information, for example, if (S=4) time slots are scheduled for transmission, i=(0, 1, . . . , S−1), $n_{HARQ\_ID}$ is a starting HARQ ID indicated in the downlink control information, $N_{HARQ}$ is a total number of HARQ IDs, and mod( ) is a remainder operator.

Figure 7:
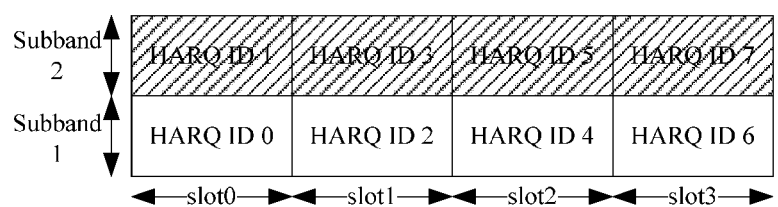
FIG. 7 is a diagram of a HARQ ID according to an embodiment.

To enable those skilled in the art to better understand and implement the present disclosure, an embodiment of the present disclosure provides another diagram of HARQ ID as shown in FIG. 7.

Referring to FIG. 7, the current BWP includes two subbands, DCI schedules 4 time slots, the starting HARQ ID is 0, and LBT detection succeeds in merely one subband (subband 2). In this case, the UE selects subband 2 to transmit PUSCH, and determines, based on the formula (2), that the HARQ IDs used by slot 0 to slot 3 are 1, 3, 5 and 7 respectively.

Figure 8:
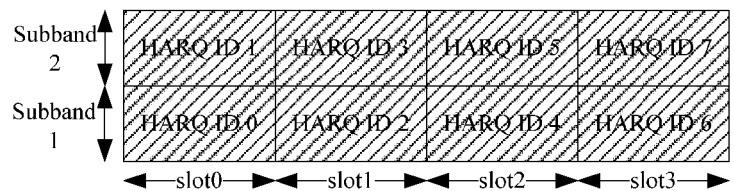
FIG. 8 is a diagram of a HARQ ID according to an embodiment.

To enable those skilled in the art to better understand and implement the present disclosure, an embodiment of the present disclosure provides another diagram of HARQ ID as shown in FIG. 8.

Referring to FIG. 8, the current BWP includes two subbands (subband 1 and subband 2), DCI schedules 4 time slots, the starting HARQ ID is 0, and LBT detection succeeds in both the two subbands. In this case, the UE selects both the subband 1 and the subband 2 to transmit the same PUSCH, and determines, for the subband 2 based on the formula (2), that the HARQ IDs used by slot 0 to slot 3 are 1, 3, 5 and 7 respectively, and for the subband 1 based on the formula (2), that the HARQ IDs used by slot 0 to slot 3 are 0, 2, 4 and 6 respectively.

By the above embodiments of the present disclosure, the high-layer signaling is received from the base station, and then the downlink control information is received from the base station, so that the UE uses a frequency domain resource corresponding to the one or more subbands for uplink data transmission to transmit uplink data, based on frequency domain resource information corresponding to the one or more subbands for uplink data transmission. An uplink resource can be indicated in unit of subband, thereby improving resource utilization and performance of a NR network.

Figure 10:
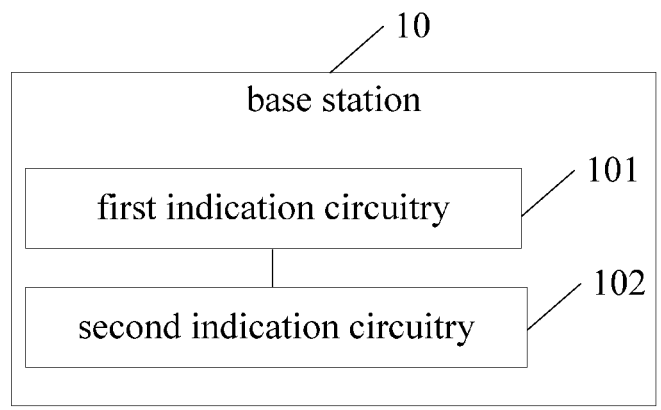
FIG. 10 is a structural diagram of a base station according to an embodiment.

To enable those skilled in the art to better understand and implement the present disclosure, an embodiment of the present disclosure further provides a base station capable of performing the uplink channel resource indication method as shown in FIG. 10.

Referring to FIG. 10, the base station 10 may include a first indication circuitry 101 and a second indication circuitry 102.

The first indication circuitry 101 is configured to indicate frequency domain resource information corresponding to N subbands contained in a current carrier to a UE through high-layer signaling, where N>1.

The second indication circuitry 102 is configured to indicate one or more subbands for uplink data transmission to the UE through downlink control information, so that the UE uses a frequency domain resource corresponding to the one or more subbands for uplink data transmission to transmit uplink data based on frequency domain resource information corresponding to the one or more subbands for uplink data transmission.

In some embodiments, the frequency domain resource information corresponding to the N subbands includes (N−1) CRB indexes, wherein the (N−1) CRB indexes are used for indicating a starting CRB of the N subbands.

In some embodiments, the second indication circuitry 102 is configured to indicate an index of the one or more subbands for uplink data transmission to the UE through a bitmap in the downlink control information.

In some embodiments, the second indication circuitry 102 is configured to indicate an index of the one or more subbands for uplink data transmission to the UE through a resource indication value in the downlink control information.

In some embodiments, the second indication circuitry 102 is configured to indicate the index of the one or more subbands for uplink data transmission using X bits in the resource indication value, wherein $$X = \text{ceil}\left(\log_2 \frac{M \times (M+1)}{2}\right),$$

M is a total number of subbands contained in a current Bandwidth Part (BWP), and ceil( ) is a round-up operator.

In some embodiments, the second indication circuitry 102 is configured to indicate a starting position and length of at least one interlaced resource cluster for uplink data transmission to the UE through a resource indication value in the downlink control information.

In some embodiments, the second indication circuitry 102 is configured to indicate the starting position and the length of the at least one interlaced resource cluster for uplink data transmission to the UE through Y bits in the resource indication value, wherein $$Y = \text{ceil}\left(\log_2 \frac{K \times (K+1)}{2}\right),$$

K is a total number of interlaced resource clusters contained in a current BWP, and ceil( ) is a round-up operator.

More details of working procedures and principles of the base station 10 can be found in the above descriptions of the uplink channel resource indication method, and are not described in detail here.

Figure 11:
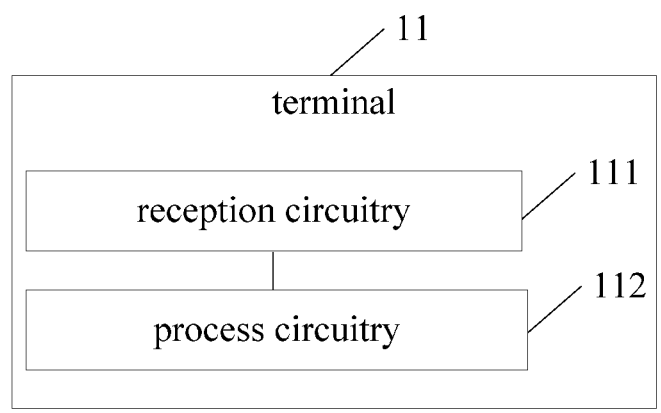
FIG. 11 is a structural diagram of a terminal according to an embodiment.

To enable those skilled in the art to better understand and implement the present disclosure, an embodiment of the present disclosure further provides a terminal capable of performing the uplink channel resource determination method as shown in FIG. 11.

Referring to FIG. 11, the terminal 11 may include a reception circuitry 111 and a process circuitry 112.

The reception circuitry 111 is configured to receive high-layer signaling from a base station, wherein the high-layer signaling includes frequency domain resource information corresponding to N subbands contained in a current carrier, where N>1.

The process circuitry 112 is configured to receive downlink control information from the base station, wherein the downlink control information includes one or more subbands for uplink data transmission, and use a frequency domain resource corresponding to the one or more subbands for uplink data transmission to transmit uplink data, based on frequency domain resource information corresponding to the one or more subbands for uplink data transmission.

In some embodiments, the frequency domain resource information corresponding to the N subbands includes (N−1) CRB indexes, wherein the (N−1) CRB indexes are used for indicating a starting CRB of the N subbands.

In some embodiments, when downlink scheduling indicates that an access mode of a PUSCH is short LBT, all of the one or more subbands for uplink data transmission correspond to one PUSCH; and when downlink scheduling indicates that the access mode of the PUSCH is long LBT, each of the one or more subbands for uplink data transmission corresponds to one PUSCH.

In some embodiments, when the access mode of the PUSCH is long LBT, the process circuitry 112 includes: a detection sub-circuitry (not shown), a selection sub-circuitry (not shown) and a first transmission sub-circuitry (not shown).

The detection sub-circuitry is configured to perform LBT detection on the one or more subbands indicated by the downlink control information.

The selection sub-circuitry is configured to select a subband where the LBT detection succeeds as a candidate subband based on a result of the LBT detection.

The first transmission sub-circuitry is configured to use the frequency domain resource corresponding to the candidate subband to transmit uplink data.

In some embodiments, the selection sub-circuitry is configured to select, among subbands where the LBT detection succeeds, a subband with a smallest index value or a greatest index value as the candidate subband.

In some embodiments, the first transmission sub-circuitry is further configured to determine a HARQ ID used by the PUSCH corresponding to the i-th time slot based on the following formula: $mod(n_{HARQ\_ID}+i,N_{HARQ})$, where i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

In some embodiments, when the access mode of the PUSCH is long LBT, the process circuitry 112 includes: a detection sub-circuitry (not shown) and a second transmission sub-circuitry (not shown).

The detection sub-circuitry is configured to perform LBT detection on the one or more subbands indicated by the downlink control information.

The second transmission sub-circuitry is configured to use the frequency domain resource corresponding to the one or more subbands where the LBT detection succeeds to transmit uplink data based on a result of the LBT detection.

In some embodiments, for each time slot, the one or more subbands correspond to the same PUSCH or different PUSCHs.

In some embodiments, when the one or more subbands correspond to the same PUSCH, the second transmission sub-circuitry is further configured to determine a HARQ ID used by the PUSCH corresponding to the i-th time slot based on the following formula: $mod(n_{HARQ\_ID}i,N_{HARQ})$, where i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

In some embodiments, when the one or more subbands correspond to different PUSCHs, the different PUSCHs correspond to different HARQ-ID versions and/or different RV versions.

In some embodiments, when the one or more subbands correspond to different PUSCHs, the second transmission sub-circuitry is further configured to determine a HARQ ID used by the PUSCH corresponding to the j-th subband based on the following formula: $mod(n_{HARQ\_ID}+i \times M+j,N_{HARQ})$, where M is a total number of subbands contained in a current BWP, j is a subband index, j of 0 indicates the subband with a lowest frequency domain position, i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

More details of working procedures and principles of the terminal 11 can be found in the above descriptions of the uplink channel resource determination method, and are not described in detail here.

In an embodiment of the present disclosure, a nonvalatile or nontransitory computer readable storage medium having computer instructions stored therein is provided, wherein when the computer instructions are executed, any one of the above uplink channel resource indication methods or the above uplink channel resource determination methods is performed.

In an embodiment of the present disclosure, a base station including a memory and a processor is provided, wherein the memory has computer instructions stored therein, and when the processor executes the computer instructions, any one of the above uplink channel resource indication methods is performed.

In an embodiment of the present disclosure, a terminal including a memory and a processor is provided, wherein the memory has computer instructions stored therein, and when the processor executes the computer instructions, any one of the above uplink channel resource determination methods is performed.

Those skilled in the art could understand that all or parts of the steps in the various methods of the above-mentioned embodiments may be completed by a program instructing relevant hardware, and the program may be stored in any computer-readable storage medium. The storage medium may include a Read Only Memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An uplink channel resource indication method, comprising:
    indicating frequency domain resource information corresponding to N subbands contained in a current carrier to a User Equipment (UE) through high-layer signaling, where N>1; and
    indicating one or more subbands for uplink data transmission to the UE through downlink control information, so that the UE uses a frequency domain resource corresponding to the one or more subbands for uplink data transmission to transmit uplink data based on frequency domain resource information corresponding to the one or more subbands for uplink data transmission,
    wherein when downlink scheduling indicates that an access mode of a Physical Uplink Share Channel (PUSCH) is short Listen Before Talk (LBT), all of the one or more subbands for uplink data transmission correspond to one PUSCH; and
    when downlink scheduling indicates that the access mode of the PUSCH is long LBT, each of the one or more subbands for uplink data transmission corresponds to one PUSCH.

2. The method according to claim 1, wherein the frequency domain resource information corresponding to the N subbands comprises (N−1) Common Resource Block (CRB) indexes, wherein the (N−1) CRB indexes are used for indicating a starting CRB of the N subbands.

3. The method according to claim 1, wherein indicating one or more subbands for uplink data transmission to the UE through downlink control information comprises:
    indicating an index of the one or more subbands for uplink data transmission to the UE through a bitmap in the downlink control information.

4. The method according to claim 1, wherein indicating one or more subbands for uplink data transmission to the UE through downlink control information comprises:
   indicating an index of the one or more subbands for uplink data transmission to the UE through a resource indication value in the downlink control information.

5. The method according to claim 4, wherein indicating an index of the one or more subbands for uplink data transmission to the UE through a resource indication value in the downlink control information comprises:
   indicating the index of the one or more subbands for uplink data transmission using X bits in the resource indication value, wherein $$X = \text{ceil}\left(\log_2 \frac{M \times (M+1)}{2}\right),$$

M is a total number of subbands contained in a current Bandwidth Part (BWP), and ceil( ) is a round-up operator.

6. The method according to claim 1, wherein indicating one or more subbands for uplink data transmission to the UE through downlink control information comprises:
   indicating a starting position and length of at least one interlaced resource cluster for uplink data transmission to the UE through a resource indication value in the downlink control information.

7. The method according to claim 6, wherein indicating a starting position and length of at least one interlaced resource cluster for uplink data transmission to the UE through a resource indication value in the downlink control information comprises:
   indicating the starting position and the length of the at least one interlaced resource cluster for uplink data transmission to the UE through Y bits in the resource indication value, wherein $$Y = \text{ceil}\left(\log_2 \frac{K \times (K+1)}{2}\right),$$

K is a total number of interlaced resource clusters contained in a current BWP, and ceil( ) is a round-up operator.

8. An uplink channel resource determination method, comprising:
   receiving high-layer signaling from a base station, wherein the high-layer signaling comprises frequency domain resource information corresponding to N subbands contained in a current carrier, where N>1; and
   receiving downlink control information from the base station, wherein the downlink control information comprises one or more subbands for uplink data transmission, and using a frequency domain resource corresponding to the one or more subbands for uplink data transmission to transmit uplink data, based on frequency domain resource information corresponding to the one or more subbands for uplink data transmission,
   wherein when downlink scheduling indicates that an access mode of a Physical Uplink Share Channel (PUSCH) is short Listen Before Talk (LBT), all of the one or more subbands for uplink data transmission correspond to one PUSCH; and
   when downlink scheduling indicates that the access mode of the PUSCH is long LBT, each of the one or more subbands for uplink data transmission corresponds to one PUSCH.

9. The method according to claim 8, wherein the frequency domain resource information corresponding to the N subbands comprises (N−1) Common Resource Block (CRB) indexes, wherein the (N−1) CRB indexes are used for indicating a starting CRB of the N subbands.

10. The method according to claim 8, wherein when the access mode of the PUSCH is long LBT, using the frequency domain resource corresponding to the one or more subbands for uplink data transmission to transmit uplink data comprises:
    performing LBT detection on the one or more subbands indicated by the downlink control information;
    selecting a subband where the LBT detection succeeds as a candidate subband based on a result of the LBT detection; and
    using the frequency domain resource corresponding to the candidate subband to transmit uplink data.

11. The method according to claim 10, wherein selecting a subband where the LBT detection succeeds as a candidate subband comprises:
    among subbands where the LBT detection succeeds, selecting a subband with a smallest index value or a greatest index value as the candidate subband.

12. The method according to claim 10, wherein using the frequency domain resource corresponding to the candidate subband to transmit uplink data further comprises: determining a HARQ ID used by the PUSCH corresponding to the i-th time slot based on the following formula:

$$\text{mod}(n_{HARQ\_ID}+i, N_{HARQ}),$$

where i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

13. The method according to claim 8, wherein when the access mode of the PUSCH is long LBT, using the frequency domain resource corresponding to the one or more subbands for uplink data transmission to transmit uplink data comprises:
    performing LBT detection on the one or more subbands indicated by the downlink control information; and
    using the frequency domain resource corresponding to the one or more subbands where the LBT detection succeeds to transmit uplink data based on a result of the LBT detection.

14. The method according to claim 13, wherein for each time slot, the one or more subbands correspond to the same PUSCH or different PUSCHs.

15. The method according to claim 14, wherein when the one or more subbands correspond to the same PUSCH, using the frequency domain resource corresponding to the one or more subbands where the LBT detection succeeds to transmit uplink data further comprises:
    determining a HARQ ID used by the PUSCH corresponding to the i-th time slot based on the following formula:

$$\text{mod}(n_{HARQ\_ID}+i, N_{HARQ}),$$

where i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

16. The method according to claim 14, wherein when the one or more subbands correspond to different PUSCHs, the different PUSCHs correspond to different HARQ-ID versions and/or different Redundancy Version (RV) versions.

17. The method according to claim 16, wherein when the one or more subbands correspond to different PUSCHs, using the frequency domain resource corresponding to the one or more subbands where the LBT detection succeeds to transmit uplink data further comprises:
    determining a HARQ ID used by the PUSCH corresponding to the j-th subband based on the following formula:

$$\mathrm{mod}(n_{HARQ\_ID}+i\times M+j, N_{HARQ}),$$

where M is a total number of subbands contained in a current BWP, j is a subband index, j of 0 indicates the subband with a lowest frequency domain position, i is a relative index corresponding to a time slot for scheduling the PUSCH in the downlink control information, $n_{HARQ\_ID}$ is a starting HARQ ID indicated in the downlink control information, $N_{HARQ}$ is a total number of HARQ IDs, and mod( ) is a remainder operator.

18. A terminal comprising a memory and a processor, wherein the memory stores one or more programs, the one or more programs comprising computer instructions, which, when executed by the processor, cause the processor to:
    receive high-layer signaling from a base station, wherein the high-layer signaling comprises frequency domain resource information corresponding to N subbands contained in a current carrier, where N>1; and
    receive downlink control information from the base station, wherein the downlink control information comprises one or more subbands for uplink data transmission, and use a frequency domain resource corresponding to the one or more subbands for uplink data transmission to transmit uplink data, based on frequency domain resource information corresponding to the one or more subbands for uplink data transmission,
    wherein when downlink scheduling indicates that an access mode of a Physical Uplink Share Channel (PUSCH) is short Listen Before Talk (LBT), all of the one or more subbands for uplink data transmission correspond to one PUSCH; and
    when downlink scheduling indicates that the access mode of the PUSCH is long LBT, each of the one or more subbands for uplink data transmission corresponds to one PUSCH.

* * * * *